(12) United States Patent
van Asten et al.

(10) Patent No.: US 7,739,931 B2
(45) Date of Patent: Jun. 22, 2010

(54) TOOL BIT WITH MULTIPLE CUTTING TIPS

(75) Inventors: Ronny W. F. van Asten, Asten (NL);
Theo G. M. J. Gommans, Venray (NL);
Tinus Zuetenhorst, Roosendaal (NL)

(73) Assignee: Xerox Corporation, Norwalk, CT (US)

( * ) Notice: Subject to any disclaimer, the term of this patent is extended or adjusted under 35 U.S.C. 154(b) by 364 days.

(21) Appl. No.: 11/830,395

(22) Filed: Jul. 30, 2007
(Under 37 CFR 1.47)

(65) Prior Publication Data
US 2009/0049963 A1    Feb. 26, 2009

Related U.S. Application Data

(60) Provisional application No. 60/834,551, filed on Jul. 31, 2006.

(51) Int. Cl.
*B23B 1/00* (2006.01)
*B23B 27/22* (2006.01)
(52) U.S. Cl. ..................................... 82/1.11; 407/113
(58) Field of Classification Search ................. 407/113, 407/11, 114, 116; 82/1.11, 47, 52
See application file for complete search history.

(56) References Cited

U.S. PATENT DOCUMENTS

| | | | |
|---|---|---|---|
| 4,123,194 A * | 10/1978 | Cave | 408/221 |
| 4,909,678 A * | 3/1990 | Kakimoto | 408/1 R |
| 5,497,642 A | 3/1996 | Greis | |
| 6,033,158 A | 3/2000 | Fountaine | |
| 6,095,907 A | 8/2000 | Greenman et al. | |
| 6,209,429 B1 | 4/2001 | Urso, III et al. | |
| 6,273,785 B1 | 8/2001 | Mulroy et al. | |
| 6,341,923 B1 * | 1/2002 | Niemi | 407/24 |
| 6,637,984 B2 * | 10/2003 | Murakawa et al. | 407/11 |
| 6,907,657 B2 | 6/2005 | Wilbert et al. | |
| 6,952,987 B2 | 10/2005 | Schreiber et al. | |
| 6,957,933 B2 * | 10/2005 | Pachao-Morbitzer et al. | 407/11 |
| 2004/0240949 A1 * | 12/2004 | Pachao-Morbitzer et al. | 407/11 |
| 2006/0263153 A1 * | 11/2006 | Isaksson | 407/113 |
| 2008/0138161 A1 * | 6/2008 | Wermeister | 407/48 |

* cited by examiner

*Primary Examiner*—Will Fridie, Jr.
(74) *Attorney, Agent, or Firm*—Fay Sharpe LLP (57) ABSTRACT

A tool bit suited to use in a machining apparatus for lathing of photoreceptor blanks includes a cutting portion which defines a plurality of projections. During lathing, the projections extend into the blank successively greater distances. When the blank is rotated, each projection cuts a successively radially inward portion of the workpiece. The resulting swarf is thinner and generally easier to handle than for a tool with a single cutting edge, thereby enabling vacuum suction of the swarf.

25 Claims, 7 Drawing Sheets

TOOL BIT WITH MULTIPLE CUTTING TIPS

This application claims the priority benefit of U.S. Provisional Application Ser. No. 60/834,551, filed on Jul. 31, 2006.

BACKGROUND

The exemplary embodiment relates to a tool bit and to a machining apparatus comprising the tool bit. It finds particular application in the machining of extruded raw tubes for forming photoreceptor drums and will be described with particular reference thereto. However, it is to be appreciated that the tool finds application in a variety of machining operations.

Photoreceptor drums for imaging devices, such as printers and copiers are typically formed by an extrusion process in which a tube is extruded from aluminum or similar metal. The extruded tube generally has imperfect dimensions and is machined to meet the high tolerance requirements of precision devices. Machining generally involves lathing the outside surface of the drum to ensure roundness, avoid conicity and form a mirror finish. Other machining steps may include removal of material from the inside surface of the ends of the drum to facilitate precise positioning of end caps, cuffing of the ends of the drums to achieve the desired drum length, and so forth.

To produce a smooth finish suitable for use in an imaging device, the tube is typically subjected to a two-stage lathing operation. In the first stage, referred to as the precut, a relatively thick layer is removed from the surface of the tube with artificial diamond tooling. The tube is rotated while the tool bit is moved parallel with the axis of rotation. This generates a helical shaving, often referred to as swarf, which may be approximately 0.2 mm in thickness and up to about 400 m in length, depending on the diameter and length of the tube. The swarf from the precut is difficult to handle because of its weight, helical shape, and sharp edges. Conventional automated vacuum systems are generally unsuited to handling the weight of the swarf from the precut stage so the swarf is often collected in a bin at the back of the lathe and handled manually. This is a labor intensive operation and has to be performed carefully to avoid injuries from the rough cut swarf. In a second stage, referred to as the finish cut, a thin layer, about 0.02 mm in thickness, is removed from the machined tool using natural diamond tooling.

INCORPORATION BY REFERENCE

U.S. Pat. No. 6,209,429 to Urso, III, et al., entitled MACHINING HOLLOW CYLINDERS, and the references cited therein describe a machining apparatus and processes for machining hollow cylinders, the disclosures of which are incorporated herein in their entireties by reference.

BRIEF DESCRIPTION

Aspects of the exemplary embodiment relate to a tool bit for a machining apparatus. The tool bit includes an attachment portion and a cutting portion supported by the attachment portion. The cutting portion defines a plurality of projections for cutting an associated workpiece which is rotatably mounted on the machining apparatus. Each of the projections defines a tip. The tips are spaced in a first direction. A second of the tips extends beyond a first of the tips in a second direction such that in operation, the first projection cuts a first portion of the workpiece and the second projection cuts a second portion of the workpiece. The second portion is radially inward of the first portion.

In another aspect, a machining apparatus includes a workpiece mounting apparatus which supports an associated workpiece for rotation about an axis. The workpiece has a radius perpendicular to the axis. A tool bit is mounted for lathing the radius. The tool bit includes a cuffing portion which defines a plurality of projections, the projections being spaced apart by recessed reliefs. A first of the projections has a tip which is spaced from a tip of a second of the projections such that in operation, the first projection cuts a first portion of the workpiece and the second projection cuts a second portion of the workpiece, radially inward of the first portion.

In another aspect, a method for machining a workpiece includes mounting a workpiece on a machining apparatus for rotation about an axis and mounting a tool bit for machining a surface of the workpiece. The workpiece is rotated about the axis. The workpiece surface is engaged by a plurality of tips of the tool bit, which successively project further towards the axis of rotation of the workpiece such that the projections each remove a strip of material from the workpiece.

DETAILED DESCRIPTION

Figure 1:
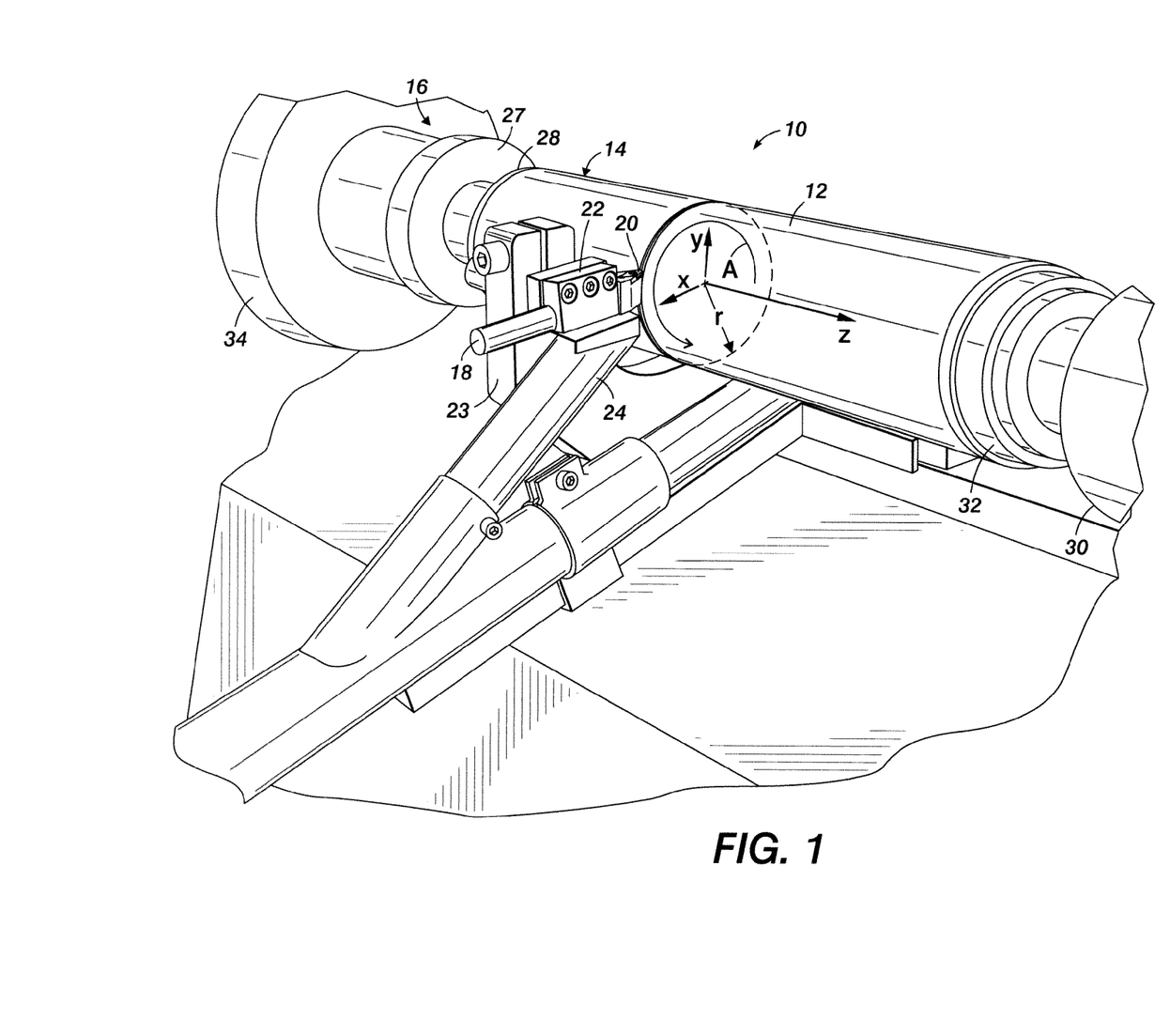
FIG. 1 is a perspective view of a lathe according to one aspect of the exemplary embodiment.

With reference to FIG. 1, a portion of a machining apparatus 10, such as a lathe is illustrated. The lathe 10 is configured for machining a rotatably mounted workpiece 12, such as a hollow cylindrical tube or "blank" having a radius r and an outer surface 14, which defines the radius, in the form of a curvilinear plane. The lathe 10 includes a workpiece mounting apparatus 16 which rotates the workpiece in the direction of arrow A substantially about a longitudinal direction Z which corresponds substantially to an imaginary axis Z-Z of the workpiece. For ease of reference, the X direction and Y direction referred to herein are perpendicular to the Z direction, as shown in FIG. 1.

Figure 2:
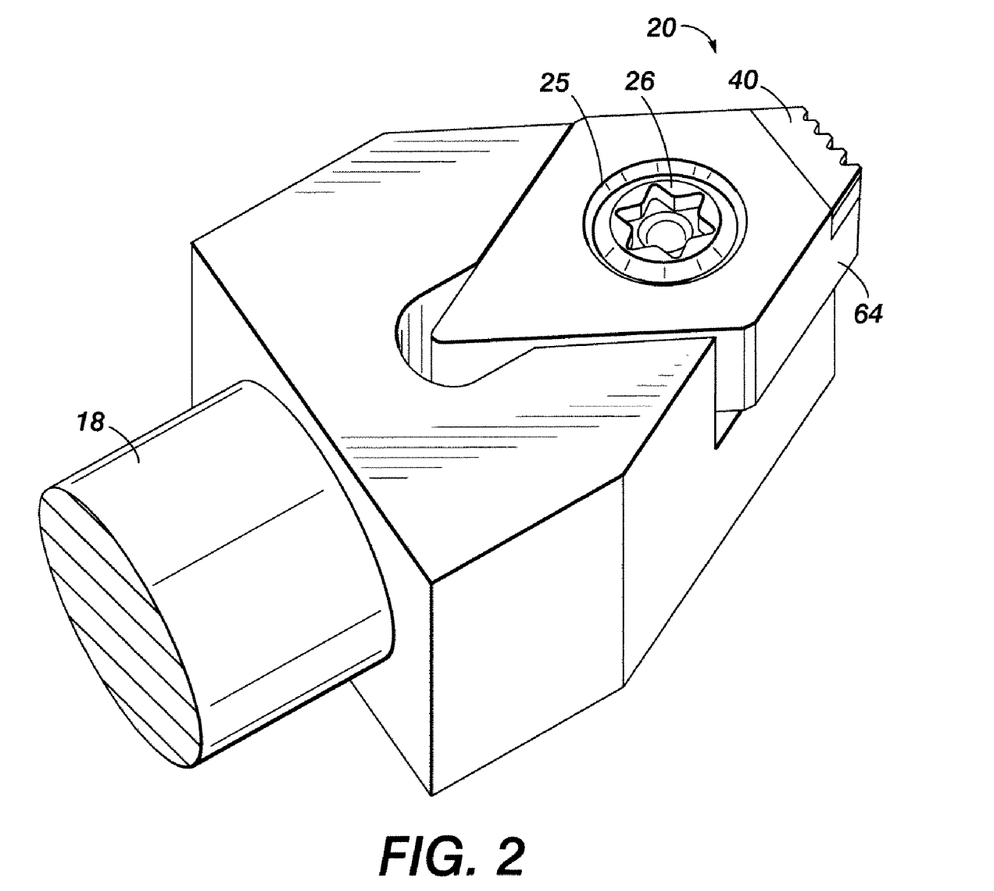
FIG. 2 is a perspective view of a cutting head which supports a tool bit for the lathe of FIG. 1.

A cutting head 18, best shown in FIG. 2, which carries a tool bit 20 at its distal end, is mounted for lathing the outer surface of the workpiece. In the illustrated embodiment, the cutting head 18 is clamped in a clamping member 22. The clamping member in turn is mounted to a guide member 23, in the form of a curved bracket, which is translated in parallel with the axis of rotation Z-Z, by a suitable drive system (not shown). As a result, the tool bit 20 moves along the workpiece 12 during lathing in a direction which is generally parallel with the axis of rotation Z-Z, (by generally parallel it is meant within about 5 degrees or less, and in one embodiment, within about 1 degree and ideally at about 0 degrees). The tool bit 20 engages the outer surface 14 of the workpiece and progressively cuts away an outer layer of the workpiece as it traverses the length of the workpiece. Swarf removed from the work piece is drawn into a vacuum tube 24, carried by the bracket 23, which communicates with a vacuum system (not shown).

The vacuum tube 24 has an inlet located slightly below the bit 20 to draw the swarf into the vacuum tube as it is generated by the bit. In this way, the conventional collection bin for swarf can be eliminated.

In one embodiment, the workpiece 12 comprises a hollow cylinder of high purity aluminum, such as from about 95% to 100% pure aluminum, to be used as a photoreceptor drum and the lathing with the tool bit 20 increases its outer surface smoothness and/or uniformity of its outer diameter.

With reference to FIG. 2, the tool bit 20 may be mounted to the cutting head 18 by any suitable and conventional technique such as with recess and set screw combination, insert cartridges (e.g. top clamp), or the like. The illustrated tool bit 20 includes a recessed bore 25 which receives a suitable fixing member 26, such as a set screw, bolt, or other suitable fixing member, for attachment of the tool bit 20 to the cutting head 18.

Lathes suitable for mounting a cylindrical workpiece are known and described, for example, in U.S. Pat. Nos. 6,907,657 and 6,209,429, the disclosures of which are incorporated herein in their entireties by reference. The mounting apparatus 16 typically includes a cylindrical supporting fixture 27 for inserting into an end 28 of the hollow workpiece for transferring rotational motion to the workpiece. A similar supporting fixture 30 may be positioned at the other end 32 of the workpiece, thereby forming a pair of such cylindrical supporting fixtures for supporting each end of the hollow workpiece. A drive system, such as a servomotor 34, rotates the supporting fixture 26 at a predetermined speed.

Figure 3:
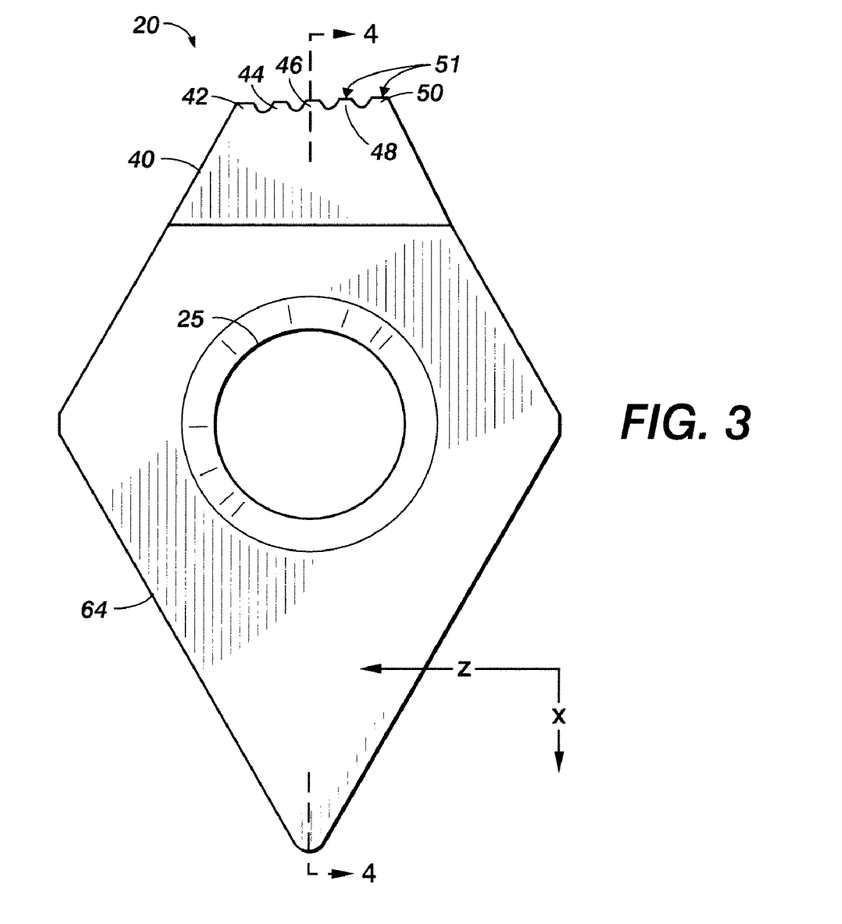
FIG. 3 is a side view of the tool bit of FIG. 2.
Figure 4:
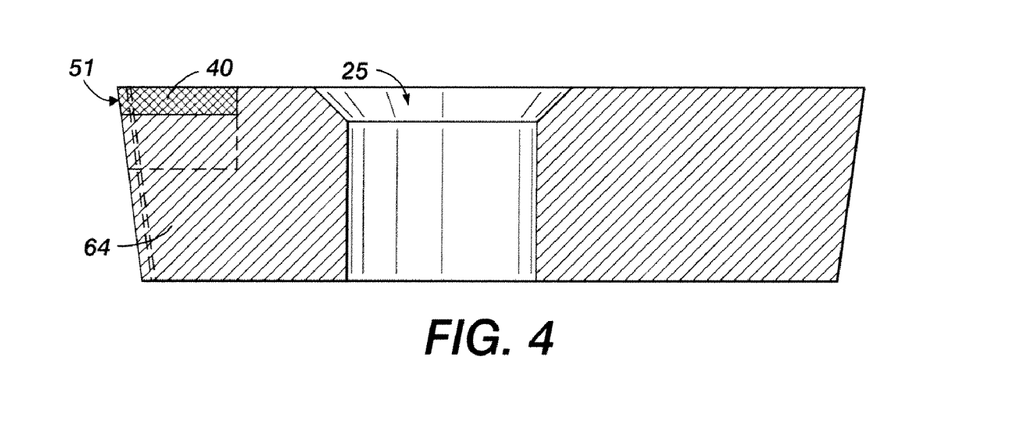
FIG. 4 is a sectional view of the tool bit of FIG. 2.
Figure 5:
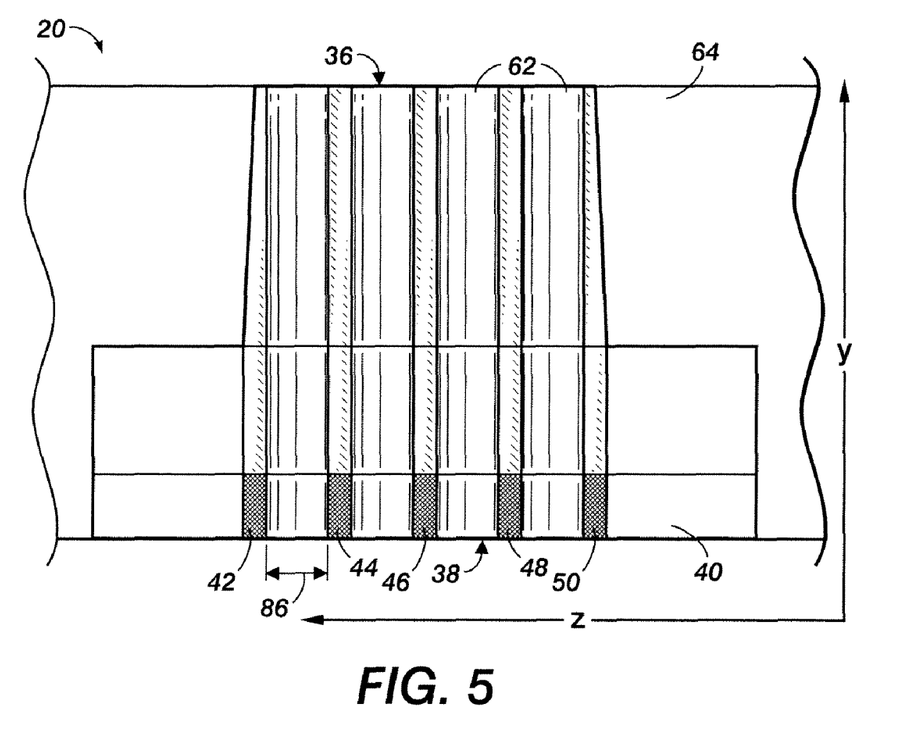
FIG. 5 is an end view of the tool bit of FIG. 3.

As shown in FIGS. 3-5, the tool bit 20 comprises a generally planar member having first and second opposed surfaces 36, 38 and a cutting portion 40 at one end. The cutting portion 40 defines a plurality of cutting tips 42, 44, 46, 48, 50 at a distal end, (five in the illustrated embodiment), which are spaced apart in the Z direction, each tip providing a cutting edge 51. The cutting tips are defined by five corresponding projections 52, 54, 56, 58, 60. As illustrated in FIG. 5, each tip may take the shape of a generally planar end surface of the respective projection. The projections are connected by recessed reliefs 62. While five cutting tips are shown in the illustrated embodiment, it is contemplated that there may be fewer or more spaced cutting tips, such as two, three, four, or six cutting tips. In general, there are fewer than ten cutting tips. The cutting tips 42, 44, 46, 48, 50 shown are generally planar and parallel to each other although it is also contemplated that the tips may be radiused or angled. The illustrated reliefs 62 are radiused although other shapes are contemplated. The tool bit 20 also defines an attachment portion 64 which supports the cutting portion and which defines the bore 22 therethrough.

Figure 6:
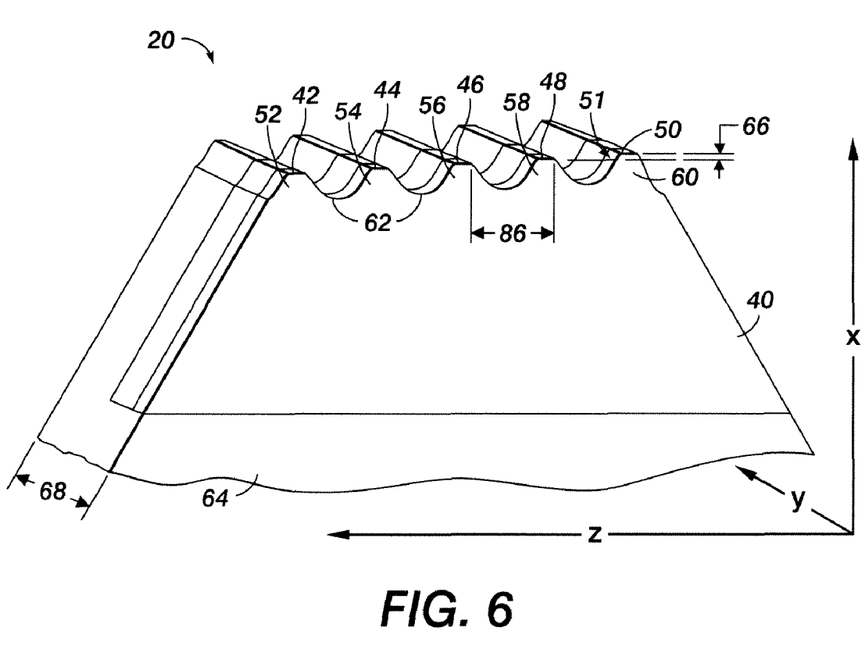
FIG. 6 is an exaggerated view of the cutting portion of the tool bit of FIG. 3.

As best shown in FIG. 6, which shows the projections in somewhat exaggerated form for clarity, the projections 52, 54, 56, 58, 60 have a vertical height, as determined in the X direction (i.e., in a direction aligned with the radius of the workpiece), which varies. Specifically, the first projection 52 is the shortest, with each successive projection being longer (radially inward), such that the last projection 60 is the tallest. Each tip thus is spaced from the next tip by a spacing 66 in the X direction. The spacing may be the same for each adjacent pair of tips or may be different. The spacing 66 corresponds to the amount of material removed by the taller of the two projections. The total radius removed from the workpiece is thus equal to the sum of the four spacings 66 plus the amount removed by the first edge 51 (which depends on where the first tip is positioned in relation to the outer surface 14 of the workpiece).

Figure 7:
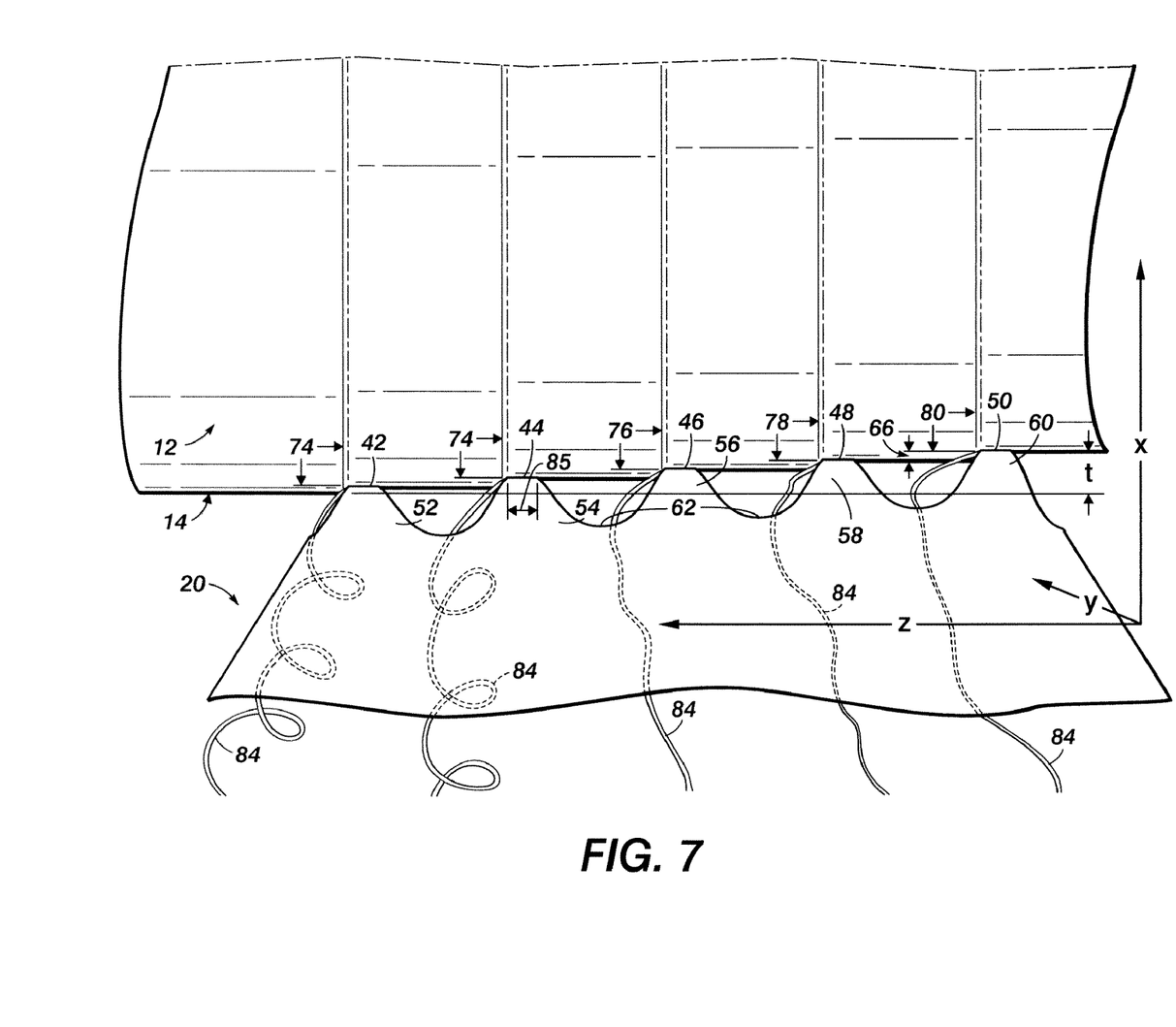
FIG. 7 illustrates machining of a workpiece with the tool bit of FIG. 3.

When the tool bit 20 is positioned adjacent the workpiece 12 as illustrated in FIG. 7 and moved transversely along the workpiece in the direction of arrow Z, the tips 42, 44, 46, 48, 50 are arranged to lie generally at mid height on the workpiece 12 with the longest projection 60 defining the target radius of the workpiece. Each cutting edge cuts a portion 72, 74, 76, 78 of the radius to be removed. The edge of the first tip 42 cuts away a radially outermost portion 72 of the material, with successive edges cutting radially inner portions 74, 76, 78, 80. The spacing 66 corresponds to the amount of material removed by the taller of the two projections.

The amount of material removed by each successive projection is thus dependent on the relative heights of adjacent pairs of projections. It has been found that if the thickness of the swarf which is machined by each of the tips is too thin, the swarf may have a tendency to break. If the swarf thickness is too great, it may be difficult to suction with a vacuum. Thus, the number of projections may be selected so as to provide a swarf thickness of about 0.03-0.08 mm. The total thickness t removed is dependent on the total of the vertical spacings 66 plus the height of the first projection, relative to the circumference 14 of the workpiece. For example, to remove a thickness of about 0.25 mm using five projections, the tips may be vertically spaced by 0.05 mm. Each edge thus creates strip of material or swarf 84 of about 0.05 mm in thickness.

The thinner, lighter swarf is easier to handle than a thicker swarf produced with a single edge. In one embodiment, the swarf 84 is removed automatically with a vacuum system positioned adjacent to the work piece. The recesses 62 between the edges are of a suitable size for spacing the tips to ensure that the swarf is generated as separate strips and may also allow any cutting fluid, which is applied to the tool bit during cutting to pass therethrough. The cutting fluid is used to cool, lubricate, and clean the workpiece. Exemplary cutting fluids include petroleum-based cutting fluids.

As illustrated in FIG. 5, the tips may each have a length 85 in the Z direction which may be the same for each tip 42, 44, 46, 48, 50. Alternatively, the tips may have different lengths. For example, the tips may be about 0.1 to about 1 mm in length, with the recessed reliefs 62 about 0.1 to about 1 mm in length. Centers of adjacent tips may spaced by a distance 86 in the Z direction which is greater than the X direction spacing 66. For example, the Z direction spacing 86 may be about 0.5 to 1.0 mm, e.g., about 0.75 mm.

The cutting portion 40 comprising projections 42, 44, 46, 48, 50, or the entire tool bit 20, may be formed of polycrystalline diamond (synthetic diamond), natural diamond, polycrystalline boron nitride, or other material suited to cutting the workpiece 12. The diamond or other crystalline content may be present either in the form of a mass comprising diamond crystals bonded to each other or of a thin skin of diamond crystals bonded to each other. The diamond content may be supported on and directly bonded to an extremely stiff substrate, such as tool steel, stainless steel, and/or or sintered tungsten carbide in order to provide mechanical support therefor. In the illustrated embodiment, cutting portion 40 including the projections and reliefs, is integrally formed and bonded to the attachment portion 64 with a suitable adhesive. However, it is also contemplated that each projection may be a separate component which is bonded to the cutting portion.

The attachment portion 64 may extend to the region of the projections as shown on FIG. 5, and define corresponding projections 90 which support the projections of the cutting portion. Tips of the projections 90 are angled away from the tips of the projections of the cuffing portion such that only the cutting portion tips engage the workpiece 12.

A method of machining a workpiece using the exemplary tool bit includes extruding a workpiece, such as an aluminum containing tube, mounting the workpiece on a lathe for rotation, and mounting the tool bit adjacent a surface of the workpiece by its attachment portion. These latter steps may be carried out in reverse order. The tool bit is translated parallel with the longitudinal axis of the rotating workpiece, whereby the workpiece surface is engaged by a plurality of projections which successively project further towards the longitudinal axis of the workpiece such that the projections each remove a strip of material from the workpiece. As will be appreciated, the exemplary tool bit does not rotate but rather maintains generally the same orientation towards the workpiece during translation.

For example, the aluminum blank may be mounted horizontally on the lathe and turned at a rotation speed of about 4000 rpm.

The exemplary tool bit 20 may be used for the precut, with a second tool bit (not shown) used for a finish cut. The second tool bit may be a conventional tool bit with a single cutting edge formed from diamond or similar grinding material. Once the precut is complete, the cutting head 18 may be removed from the clamp 22 and a new cutting head with a single edge tool bit installed for the second cut. Alternatively, the finish cut may be omitted, with the last projection 60 essentially providing the second cut. In this embodiment, the last projection 60 may have a diamond coating.

The precut may move in a linear path parallel to the workpiece's rotating axis with a speed of about 0.15 mm/revolution of the workpiece. This is known as the feed rate. The feed rate may be selected so that each tip progresses no more than the width 85 of the tip with each revolution of the workpiece.

Figure 8:
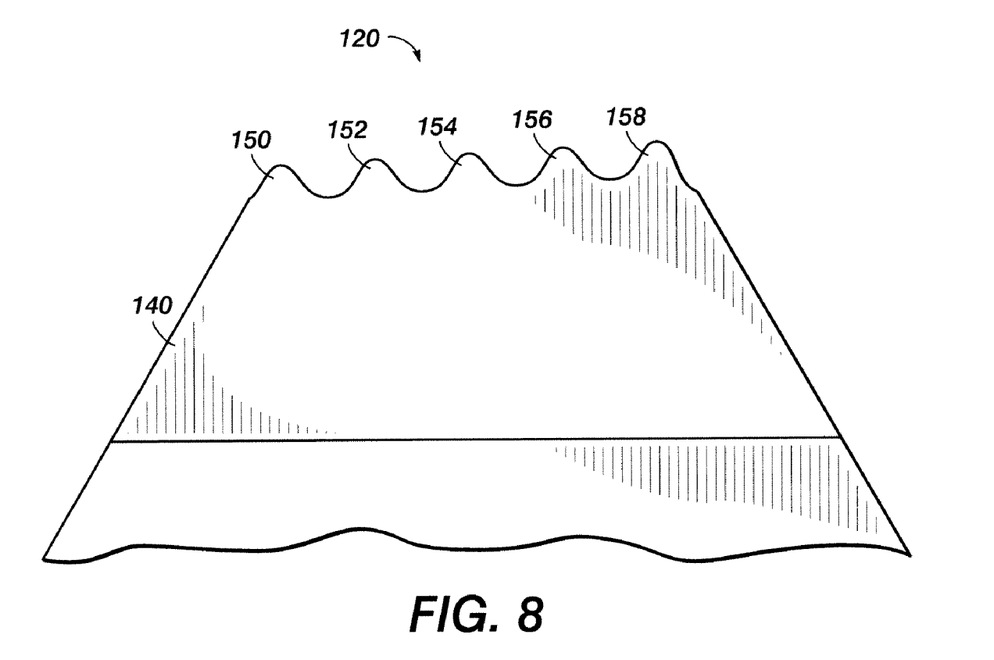
FIG. 8 is an enlarged view of a second embodiment of a cutting portion for the tool bit of FIG. 3.

FIG. 8 illustrates another embodiment of a cutting portion 140 of a tool bit 120 which may be similarly formed to the tool bit 20 except as otherwise noted. In this embodiment, tips 152, 154, 156, 158 of the projections are radiused rather than having flat edges. Of course, during use, the tips may eventually become flattened as for the projections of FIG. 6.

To form electrophotographic imaging members, the machined workpiece 12 may be coated with one or more organic layers, such as a blocking layer, a charge generating layer, and a charge transport layer. Optional adhesive, overcoating and anti-curl layers may also be included. Alternatively, a single photoconductive layer may be applied to the workpiece. Thus, for the manufacture of electrophotographic imaging members, at least one photoconductive coating is applied to the workpiece.

In addition to use on newly extruded tubes, the exemplary method may be used on reclaimed tubes, such as used photoreceptor drums as described, for example, in U.S. Pat. No. 5,670,290, the disclosure of which is incorporated herein by reference in its entity. In this process, the imaging layer(s) are removed and material removed from the aluminum substrate to a radial distance of between about 10 micrometers and about 400 micrometers to improve the smoothness.

Tests on the tool bit 20 demonstrate that the swarf is easier to handle than when a conventional tool is used to remove the same amount of material in a single pass.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tool bit for a machining apparatus comprising:
an attachment portion; and
a cutting portion supported by the attachment portion and defining a plurality of projections for cutting an associated workpiece to increase a uniformity of an outer diameter of the workpiece when the workpiece is rotatably mounted on the machining apparatus, such that the workpiece rotates about a longitudinal axis, each of the projections defining a tip, the tips being spaced in a first direction, wherein each tip of the cutting portion defines a planar surface, each of the planar surfaces extending parallel to each other in the first direction, a second of the tips extending beyond a first of the tips in a second direction such that in operation, the first projection cuts a first portion of the workpiece and the second projection cuts a second portion of the workpiece, the second portion being radially inward of the first portion.

2. The tool bit of claim 1, wherein the attachment portion defines a bore for receiving a fixing member for attachment of the tool bit to the associated machining apparatus.

3. The tool bit of claim 1, wherein there are at least three projections.

4. The tool bit of claim 1, wherein there are five projections.

5. A machining apparatus comprising:
a tool bit comprising:
an attachment portion; and
a cutting portion supported by the attachment portion and defining at least three projections for cutting an associated workpiece to reduce a radius of the workpiece when the workpiece is rotatably mounted on the machining apparatus, each of the projections defining a tip, the tips being spaced in a first direction, a second of the tips extending beyond a first of the tips in a second direction such that in operation, the first projection cuts a first portion of the workpiece and the second projection cuts a second portion of the workpiece, the second portion being radially inward of the first portion, a plurality of the tips being each equally spaced from an adjacent tip in the second direction, such that each associated projection removes approximately the same amount of material from the work piece as the cutting tool is translated, a spacing between the first and second projections in the second direction corresponding to the amount of material removed from the workpiece by the second projection.

6. The tool bit of claim 1, wherein the each of the tips is equally spaced from an adjacent tip in the second direction.

7. The tool bit of claim 1, wherein each of the tips is spaced from an adjacent tip in the first direction by a distance which is greater than the spacing in the second direction.

8. The tool bit of claim 7, wherein the each of the tips is equally spaced from an adjacent tip in the second direction.

9. The tool bit of claim 1, wherein the projections and reliefs are integrally formed from the same material.

10. A machining apparatus comprising:
a workpiece mounting apparatus which supports an associated workpiece for rotation about an axis, the workpiece having a radius perpendicular to the axis;
a tool bit mounted for lathing the radius by traversing the workpiece's length, the tool bit comprising:
a cutting portion which defines a plurality of projections, the projections being spaced apart by recessed reliefs, a first of the projections having a tip which is spaced from a tip of a second of the projections such that in operation, the first projection cuts a first portion of the workpiece and the second projection cuts a second portion of the workpiece, radially inward of the first portion, the tip of a longest projection of the cutting portion including a planar surface which defines a target radius of the workpiece.

11. The tool bit of claim 1, wherein the first direction is perpendicular to the second direction.

12. The tool bit of claim 1, wherein each projection defines a cutting edge.

13. The tool bit of claim 1, wherein the projections are formed from at least one of natural diamond, polycrystalline diamond, and polycrystalline boron nitride.

14. A machining apparatus comprising the tool bit of claim 1.

15. A combination comprising the tool bit of claim 1 and a cylindrical workpiece.

16. The machining apparatus of claim 10, wherein each tip defines a planar surface, each of the planar surfaces extending parallel to each other in the first direction.

17. The machining apparatus of claim 10, wherein the projections are aligned with a mid-height of the workpiece.

18. The machining apparatus of claim 10, further comprising a vacuum tube having an inlet proximate the cutting portion for suctioning swarf removed from the radius.

19. The machining apparatus of claim 10, wherein each projection generates a separate strip of swarf during lathing.

20. The machining apparatus of claim 10, wherein the tool bit is supported for translation in a direction generally parallel with the axis.

21. A method for machining a workpiece comprising:
mounting a workpiece on a machining apparatus for rotation about an longitudinal axis;
mounting a tool bit for machining a surface of the workpiece;
rotating the workpiece about the longitudinal axis, the workpiece surface being engaged by a plurality of tips of the tool bit, which successively project further towards the axis of rotation of the workpiece such that the projections each remove a strip of material from the workpiece; and
translating the tool bit generally parallel with the longitudinal axis of the rotating workpiece at a rate at which each tip progresses at no more than a width of the tip with each revolution of the workpiece.

22. The method of claim 21, wherein during transverse motion a shortest of the projections advances ahead of the longest of the projections.

23. The method of claim 21, wherein the toolbit is used for a first cut of the workpiece, the method further comprising using a second toolbit for a second cut.

24. The method of claim 21, wherein the workpiece comprises a photoreceptor drum and the method further comprises coating the machined photoreceptor drum with at least one organic layer.

25. The method of claim 21, wherein the workpiece comprises a photoreceptor drum with a substrate and an imaging layer and the translating includes removing the imaging layer and material from the substrate to improve its smoothness.

* * * * *